(12) United States Patent
Cheng et al.

(10) Patent No.: US 12,444,341 B2
(45) Date of Patent: Oct. 14, 2025

(54) DATA PROCESSING METHOD, DEVICE, AND SYSTEM

(71) Applicant: Lenovo (Beijing) Limited, Beijing (CN)

(72) Inventors: Tao Cheng, Beijing (CN); Xiaoyan Shi, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 0 days.

(21) Appl. No.: 17/977,543

(22) Filed: Oct. 31, 2022

(65) Prior Publication Data
US 2023/0135842 A1    May 4, 2023

(30) Foreign Application Priority Data
Nov. 1, 2021    (CN) .......................... 202111284257.0

(51) Int. Cl.
G09G 3/20    (2006.01)

(52) U.S. Cl.
CPC .................................. *G09G 3/2092* (2013.01)

(58) Field of Classification Search
CPC .... G09G 3/2092; G09G 2354/00; G09G 3/20; G06F 9/451; G06F 3/04162; G06F 3/04847; G06F 3/0488; G06F 9/4451
See application file for complete search history.

(56) References Cited

U.S. PATENT DOCUMENTS

| | | | | |
|---|---|---|---|---|
| 6,211,891 B1* | 4/2001 | Wahlig | ................... | G06F 9/4411 345/550 |
| 6,252,606 B1* | 6/2001 | Vaswani | ................ | G06T 11/203 345/441 |
| 8,736,585 B2* | 5/2014 | Omata | ................... | G06F 1/1626 345/173 |
| 9,529,463 B1* | 12/2016 | Ramani | ..................... | G09G 5/00 |
| 10,755,029 B1* | 8/2020 | de la Fuente | ........ | G06F 3/04883 |
| 11,009,944 B1* | 5/2021 | Choi | ..................... | G09G 3/3275 |
| 2005/0057549 A1* | 3/2005 | Tachibana | ............ | G09G 3/3677 345/205 |
| 2005/0206656 A1* | 9/2005 | Cooper | .................. | G06T 11/203 345/660 |
| 2007/0273673 A1* | 11/2007 | Park | ..................... | G06F 3/04883 345/179 |
| 2013/0300755 A1* | 11/2013 | Liu | ............................ | G06F 3/14 345/545 |
| 2013/0314429 A1* | 11/2013 | Croxford | ................ | G09G 5/393 345/531 |
| 2014/0086105 A1* | 3/2014 | Kang | ....................... | H04L 67/55 370/259 |
| 2014/0146874 A1* | 5/2014 | Ju | ......................... | H04N 23/815 375/240.02 |
| 2014/0184517 A1* | 7/2014 | Motta | ................... | G06F 3/0488 345/173 |
| 2014/0253462 A1* | 9/2014 | Hicks | ................... | G06F 3/03545 345/173 |

(Continued)

*Primary Examiner* — Jose R Soto Lopez
(74) *Attorney, Agent, or Firm* — ANOVA LAW GROUP, PLLC

(57) ABSTRACT

A data processing method includes obtaining input information inputted by the input device for display on a display device and transmitting the input information to a display driver chip of the display device to cause the display driver chip to generate a first image output on the display device based on the input information.

12 Claims, 2 Drawing Sheets

---

Obtain input information inputted by the input device for display on the display device — S101

Transmit the input information to a display driver chip of the display device to cause the display driver chip to generate a first image output on the display device based on the input information — S102

(56) References Cited

U.S. PATENT DOCUMENTS

| | | | | |
|---|---|---|---|---|
| 2014/0337649 A1* | 11/2014 | Biswas | G09G 5/001 | |
| | | | 713/323 | |
| 2015/0277653 A1* | 10/2015 | Xiong | H04N 5/265 | |
| | | | 345/173 | |
| 2015/0279074 A1* | 10/2015 | Xiong | G06T 11/60 | |
| | | | 345/629 | |
| 2015/0301678 A1* | 10/2015 | Park | G06T 1/20 | |
| | | | 345/173 | |
| 2016/0004375 A1* | 1/2016 | Xiong | G06F 3/04184 | |
| | | | 345/173 | |
| 2016/0077618 A1* | 3/2016 | An | G06F 3/0416 | |
| | | | 345/173 | |
| 2016/0139778 A1* | 5/2016 | An | H04N 5/272 | |
| | | | 345/173 | |
| 2016/0306448 A1* | 10/2016 | Fleck | G06F 3/0383 | |
| 2016/0352383 A1* | 12/2016 | Richmond | H04M 1/0202 | |
| 2016/0364831 A1* | 12/2016 | Spanton | G06T 15/005 | |
| 2017/0039967 A1* | 2/2017 | Jung | G09G 3/3648 | |
| 2017/0308226 A1* | 10/2017 | Yoo | G06F 3/03545 | |
| 2018/0024654 A1* | 1/2018 | Koike | G06F 3/0441 | |
| | | | 345/174 | |
| 2018/0033360 A1* | 2/2018 | Bae | G09G 3/2096 | |
| 2018/0061308 A1* | 3/2018 | Bae | G09G 5/393 | |
| 2018/0143703 A1* | 5/2018 | Fleck | G06F 3/0383 | |
| 2018/0330671 A1* | 11/2018 | Kim | G09G 3/3266 | |
| 2019/0027120 A1* | 1/2019 | Croxford | G09G 3/001 | |
| 2019/0050188 A1* | 2/2019 | Park | G06F 1/06 | |
| 2019/0073961 A1* | 3/2019 | Park | G02F 1/1362 | |
| 2020/0082492 A1* | 3/2020 | Wang | G06T 1/20 | |
| 2020/0082493 A1* | 3/2020 | Wang | G06T 1/20 | |
| 2020/0118239 A1* | 4/2020 | Wu | G09G 5/363 | |
| 2020/0319719 A1* | 10/2020 | Files | G06F 1/1613 | |
| 2021/0034188 A1* | 2/2021 | Kwon | G06F 3/0346 | |
| 2021/0208758 A1* | 7/2021 | Miyazawa | G06F 3/0416 | |
| 2022/0155878 A1* | 5/2022 | Park | G06F 1/1698 | |
| 2022/0187930 A1* | 6/2022 | Kang | G06F 3/02 | |
| 2022/0221972 A1* | 7/2022 | Hisano | G06F 3/03545 | |
| 2022/0357843 A1* | 11/2022 | Jia | G06F 3/04883 | |
| 2023/0178000 A1* | 6/2023 | Goetz | G09G 5/363 | |
| | | | 345/204 | |
| 2023/0266875 A1* | 8/2023 | Kasatani | G06F 3/03545 | |
| | | | 715/764 | |
| 2023/0306192 A1* | 9/2023 | Xiao | G06F 40/169 | |
| 2023/0326103 A1* | 10/2023 | Kato | G06V 30/32 | |
| | | | 345/442 | |
| 2023/0419891 A1* | 12/2023 | Yamazaki | G09G 3/3225 | |

* cited by examiner

DATA PROCESSING METHOD, DEVICE, AND SYSTEM

CROSS-REFERENCE TO RELATED APPLICATION

This application claims priority to Chinese Patent Application No. 202111284257.0, filed on Nov. 1, 2021, the entire content of which is incorporated herein by reference.

TECHNICAL FIELD

The present disclosure relates to the data processing technology field and, more particularly, to a data processing method, device, and system.

BACKGROUND

Smart devices are widely used. For example, through a touch screen of a smart device or an electronic drawing board connected to the smart device, a user can draw a required graphic through an input tool such as a stylus. The graphic will be displayed on a screen of the smart device for a subsequent application.

However, when an input signal is transmitted to a processing device of the smart device, and signal preprocessing and trajectory identification and processing are required, a delay will occur for image display due to limitation of a computation rate of the processing device, which reduces user experience.

SUMMARY

Embodiments of the present disclosure provide a data processing method. The method includes obtaining input information inputted by the input device for display on a display device and transmitting the input information to a display driver chip of the display device to cause the display driver chip to generate a first image output on the display device based on the input information.

Embodiments of the present disclosure provide a data processing device, including an acquisition circuit and a first transmission circuit. The acquisition circuit is configured to obtain input information input by an input device and for display on a display device. A first transmission circuit is configured to transmit the input information to a display driver chip of the display device to cause the display driver chip to generate a first image output on the display device based on the input information.

Embodiments of the present disclosure provide a data processing system. The system includes an input device and a display device. The input device is configured to obtain input information. The display device, which is able to connect to the input device, includes a display driver chip, and is configured to output a first image. The display driver chip is configured to generate the first image based on the input information.

DETAILED DESCRIPTION OF THE EMBODIMENTS

The technical solutions in embodiments of the present disclosure will be described in detail below with reference to the drawings in the embodiments of the present disclosure. Apparently, the described embodiments are only some embodiments of the present disclosure, not all embodiments. Based on embodiments of the present disclosure, all other embodiments obtained by those of ordinary skill in the art without creative efforts shall be within the scope of the present disclosure.

A data processing method of embodiments of the present disclosure can be applied to an electronic apparatus. The electronic apparatus includes an input device and a display device. Correspondingly, the electronic apparatus can be provided with an input device and a display device. For example, the electronic apparatus may be a display device having a touch screen. A target object may perform information input based on the touch screen. Correspondingly, the touch screen may also display relevant image data. In another manner, the electronic apparatus may also be connected to the input device and the display device with the display function through a communication connection module to realize the functions of information input and image data display.

Figure 1:
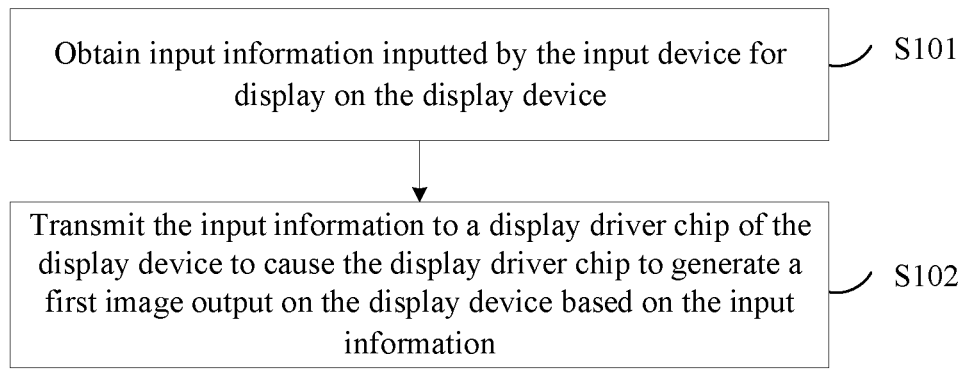
FIG. 1 illustrates a schematic flowchart of a data processing method according to embodiments of the present disclosure.

FIG. 1 illustrates a schematic flowchart of a data processing method according to embodiments of the present disclosure. The method includes the following processes.

At S101, input information inputted by the input device for display on the display device is obtained.

At S102, the input information is transmitted to a display driver chip of the display device to cause the display driver chip to generate a first image output on the display device based on the input information.

The input information generated by the input device in process S101 may need to be displayed on the display device. In embodiments of the present disclosure, the input information may be processed by the display driver chip of the display device. Thus, the input device may need to be connected to the display device. That is, the input information generated by the input device can be transmitted to the display driver chip of the display device.

A processing parameter matching the input information may be stored in the display driver chip of the display device. Thus, the input information can be processed through the processing parameter. The processing parameter can be a parameter in a corresponding processing algorithm that can convert input information into corresponding image data. The corresponding processing algorithm may include but is not limited to a scan conversion algorithm for a straight line segment, a numerical differentiation method, an anti-aliased line drawing algorithm, etc.

Correspondingly, the input information may be information such as an input trajectory, an input graphic, input text, and a symbol generated by the target object through the input device. The input device may include a stylus, a smart drawing board, a touch screen, etc., that can generate the input information. A display driver chip (Driver IC) may be a main functional member in the display device that generates and outputs the display image and can be configured to process the input information to generate the image data that can be output by the display device. In embodiments of the present disclosure, the display driver chip of the display device may be configured to directly process the input information to generate the first image. Then, the first image may be output through an output assembly of the display device.

In embodiments of the present disclosure, the input information may be directly input into the display driver chip of the display device and processed by the display driver chip to obtain the first image output by the display device. The processing device may usually need to process and execute a lot of information, and available processing resources may be limited. The processing efficiency of the input information may be reduced to cause an image data generation speed to slow down, which cannot satisfy an input information preview requirement of the target object. Thus, by using the disclosed method, the processing device corresponding to the display device of the electronic apparatus may not need to be waited to process the input information. In embodiments of the present disclosure, the display driver chip may be configured to directly process the input information to generate the corresponding image, which reduces the delay of the apparatus and satisfies a rapid display requirement of the image corresponding to the input information.

In order to generate image data matching the input information generated by an operation object of the input device, the input information may need to be processed according to the corresponding configuration information when the image data is generated. In embodiments of the present disclosure, the data processing method may further include responding to an input trigger instruction, controlling the display driver chip of the display device to obtain the configuration information related to the input information matching the input trigger instruction, and processing the input information based on the configuration information to obtain the first image.

The input trigger instruction may be a start instruction for the target object for the input device, an instruction for starting a corresponding input application in the electronic apparatus, or an instruction generated by a target controller. For example, the input trigger instruction may be an instruction generated by triggering an on-button of the stylus or an instruction generated by an operation of pulling the stylus out of a fixture. Correspondingly, the configuration information related to the input information may refer to information that can be used to configure the input information to generate the corresponding image. For example, the configuration information may include line shape configuration information, line width configuration information, and line color configuration information for an input trajectory. In some embodiments, the configuration information related to the input information can be determined by the target object that operates the input device, by default configuration information of the input device, or according to predetermined configuration information corresponding to different target objects. For example, the configuration information related to the input matching the input trigger instruction may include that a line color is red, and a shape is a dotted line. If the input device is a stylus, when the user draws a circle with the stylus, the circle may be processed according to the above configuration information. Thus, the image displayed on the display device may be a red dotted line circle.

In some embodiments, the configuration information related to the input information matching the input trigger instruction may be configuration information pre-stored in the display driver chip or configuration information obtained by a processing device connected to the display driver chip. In some embodiments, the display driver chip of the display device may be controlled to obtain the configuration information related to the input information matching the input trigger instruction from the configuration information stored in the display driver chip. If no configuration information related to the input information matching the input trigger instruction is stored in the display driver chip, the display driver chip may be controlled to obtain the configuration information related to the input information matching the input trigger instruction in the processing device.

After the input trigger instruction is obtained, the input trigger instruction may be parsed to obtain the configuration information related to the input information corresponding to the input trigger instruction. Then, inquiry may be performed on the configuration information stored in the display driver chip to determine whether the configuration information related to the input information exists. If the configuration information exists, the configuration information related to the input information may be directly retrieved from the configuration information pre-stored in the display driver chip. If the configuration information does not exist, the display driver chip may be controlled to obtain the configuration information related to the input information matching the input trigger instruction in the processing device. For example, the display driver chip may send a configuration information acquisition request to the processing device. After receiving the acquisition request, the processing device may feed back the configuration information related to the corresponding input information to the display driver chip. Thus, the display driver chip can process the input information based on the configuration information related to the input information to obtain the first image.

In embodiments of the present disclosure, the processing device or the controller may be a central processing unit (CPU) of the electronic apparatus or a graphics processing unit (GPU) of the electronic apparatus. Both the CPU and the GPU can be connected to the display device. That is, the generated image data or the corresponding information may be sent to the display device.

In some other embodiments of the present disclosure, when the input information is transmitted to the display driver chip of the display device, the input information may also be transmitted to the processing device connected to the display device. The processing device may be configured to generate a second image based on the input information.

Figure 2:
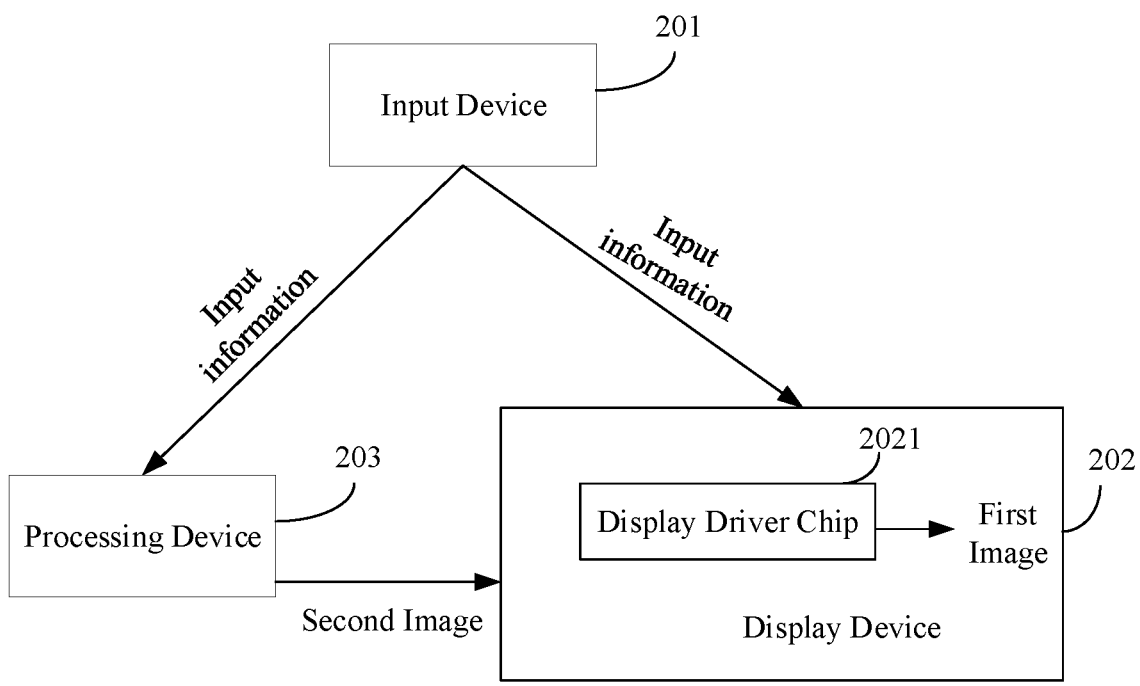
FIG. 2 illustrates a schematic diagram showing a data flow direction of another data processing method according to embodiments of the present disclosure.

FIG. 2 illustrates a schematic diagram showing a data flow direction of another data processing method according to embodiments of the present disclosure. The input information generated by the input device 201 may be transmitted to the display device 202 and the processing device 203 simultaneously. Then, the display device 202 may be configured to process the input information based on the display driver chip based on the display driver chip 2021 in the display device to generate a first image, and then the first image will be generated. The output is performed through an output component of the display device to generate the first image. Then, the first image may be output through the output assembly corresponding to the display device. For example, when the output assembly is a screen, the first image may be displayed on the screen. Meanwhile, the processing device may process the input information to generate the second image. Since the processing device executes a lot of processing information, or the processing device may need to combine other application information when processing the input information, time for generating the second image may be later than processing time of generating the first image by the display driver chip. Thus, the display device may first output the first image to cause the user to be able to obtain the image corresponding to the input information more quickly.

In some embodiments, in response to the first image output by the display device satisfying a target condition, the processing device may be controlled to output the second image to the display device to replace the first image with the second image.

The target condition may refer to a condition of replacing the first image with the second image, which may be a condition after time for outputting the first image that satisfies a predetermined display time period, or a corresponding operation matching condition of an operation for the first image.

In some embodiments, the target condition may refer to a condition after the second image is generated. That is, in response to the processing device generating the second image, the processing device may be controlled to output the second image to the display device to replace the first image with the second image. The processing efficiency of generating the image based on the input information by the processing device is lower than the processing efficiency of generating the image based on the input information by the display driver chip. Thus, even if the input information is input to the display driver chip and the processing device simultaneously, the display driver chip may generate the first image first. The time when the processing device generates the second image may be later than the time when the display driver chip generates the first image. Therefore, in order to ensure fast output of images, the display device will output the first image first. After the second image is generated, the first image may be replaced with the second image. Thus, the image corresponding to the input information may subsequently be further processed.

In some other embodiments, in response to the received trigger instruction satisfying the instruction condition, the processing device may be controlled to output the second image to the display device. The trigger instruction may be an instruction for the first image, for example, a refresh instruction of the target object for the first image, an automatic refresh instruction of the apparatus for the first image, or an optimization instruction for the first image. In some embodiments, since the processing capability of the display driver chip is not as good as the processing capability of the image processor or the central processing unit, the image processor and/or the central processing unit may be selected to perform more advanced processing on the displayed image. For example, the generated image may be added with the corresponding text information, or the generated display image may be changed, etc. Therefore, after receiving the above trigger instruction, the processing device may be controlled to output the second image to the display device to replace the first image with the second image.

In embodiments of the present disclosure, the second image may merely be cached without replacing the first image. In some embodiments, whether the first image needs to be replaced with the second image may be determined according to the actual application scenario.

The second image generated by the processing device may include an image fused by a first sub-image and a second sub-image. The first sub-image is generated by the processing device based on the input information. The second sub-image may be generated by the processing device based on the target application information.

The processing device may include a CPU or a GPU. When generating the image data based on the input information, the CPU or GPU may generate the first sub-image based on the input information and the second sub-image based on the target application information corresponding to the input information. The final first sub-image may be the image fused by the first sub-image and the second sub-image. The target application (APP) information may be associated information used to generate the input information, such as input cursor information. The target APP information may also be the information of a current input APP. For example, the input APP corresponding to the input device may be a drawing App, and the corresponding target APP information may be the information when the drawing app receives the input information, such as image editing and display menu information, etc. A corresponding fusion manner may include an image layer processing manner. Each image layer may include many pixels. The image layers may be stacked to form a whole image. That is, when the processing device renders and generates the second image, the first sub-image and the second sub-image may be used as layers in the whole second image, respectively.

Thus, when the second image generated by the processing device is used to replace the first image, the whole image may be replaced, or the second sub-image generated by the processing device based on the target APP information may be stacked on the first image to obtain the second image. Thus, when rapidly outputting and inputting the object simultaneously, the display device may further input the image that satisfies the requirement of the subsequent operation.

In some other embodiments of the present disclosure, in response to the display device outputting the first image, the processing device may be controlled to obtain an image adjustment instruction matching the first image. Thus, the processing device may perform an adjustment on the first image based on the image adjustment instruction. The processing device may be controlled to output the adjusted target image.

After the display device generates the first image, if the first image needs to be further processed, such as modification, adjustment, and optimization, the image adjustment instruction matching the first image may be received. The display control chip may be configured to respond to the image adjustment instruction. In some embodiments, processing algorithms or processing parameters stored in the display control chip may be limited. Therefore, the image adjustment instruction may be usually adjusted by a more powerful processing device. That is, the processing device may perform parsing on the image adjustment instruction to obtain corresponding adjustment information. The processing device may further perform an adjustment on the first image based on the adjustment information to obtain the target image. The processing device may be controlled to output the target image to the display device for display. For example, the image adjustment instruction may include performing image turning on the current first image. Thus, the display device may perform turning on the first image according to a corresponding image-turning processing process to output the image after being turned to the display device.

In some embodiments, if the display driver chip includes the configuration information matching the image adjustment instruction, the adjustment configuration information obtained by the processing device based on parsing of the image adjustment instruction may be sent to the display driver chip. Thus, the display driver chip may perform the adjustment on the first image based on the adjustment configuration information to obtain the target image.

When the display driver chip responds to the image adjustment instruction, the display driver chip may need to store the configuration information corresponding to the image adjustment instruction. For example, if the image adjustment instruction includes performing the adjustment on line width, the display driver chip may include a line width parameter, such as optional line width parameters or exemplary images that represent different line widths, etc. The processing device may perform parsing on the image adjustment instruction to obtain corresponding adjustment configuration information. The adjustment configuration information may be used to adjust the first image through the display driver chip to obtain the target image. For example, the image adjustment instruction may include adjusting the line width of the first image from No. 5 to No. 6. The display driver chip may store line display images corresponding to different line widths. Therefore, the processing device can send the configuration information of adjusting to No. 6 obtained by parsing to the display driver chip. Then, the display driver chip may be configured to retrieve the line matching No. 6 to adjust the first image to obtain the target image.

In embodiments of the present disclosure, the display device may be a touch screen. An input trajectory generated by sliding an input object such as a finger or a stylus on the touch screen may be processed based on the display processing chip in the screen to obtain a corresponding image that is displayed on the screen immediately, without waiting for the processing device (such as CPU or GPU) to process a large number of operations to generate and output the corresponding image, which can break through the image processing limit of the processing device, reduce the delay of the input device, and satisfy the requirement of the user to rapidly obtain the display image.

Figure 3:
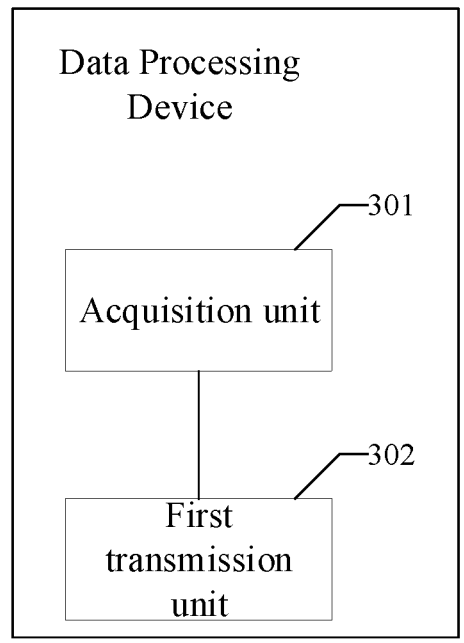
FIG. 3 illustrates a schematic structural diagram of a data processing device according to embodiments of the present disclosure.

FIG. 3 illustrates a schematic structural diagram of a data processing device according to embodiments of the present disclosure. The data processing device includes an acquisition unit 301 and a first transmission unit 302.

The acquisition unit 301 may be configured to obtain the input information inputted by the input device and used to be displayed on the display device.

The first transmission unit 302 may be configured to transmit the input information to the display driver chip of the display device. Thus, the display driver chip may generate the first image output on the display device based on the input information.

In the data processing device of embodiments of the present disclosure, the input information of the input device may be directly processed by the display driver chip of the display device to generate the first image. The first image may be output to the display device for display. The processing device that executes a lot of processing information may not need to be waited to perform the processing on the input information. Thus, the image corresponding to the input information may be rapidly displayed to satisfy the actual display requirement.

Further, the data processing device may further also include a first controller.

The first controller may be configured to control the display driver chip of the display device to obtain the configuration information related to the input information matching the input trigger instruction in response to the input trigger instruction and perform processing on the input information based on the configuration information to obtain the first image.

In some embodiments, the first controller may include a first control sub-unit and a second control sub-unit.

The first control sub-unit may be configured to control the display driver chip of the display device to obtain the configuration information related to the input information matching the input trigger instruction from the configuration information stored in the display driver chip.

The second control sub-unit may be configured to control the display driver chip to obtain the configuration information related to the input information matching the input trigger instruction in the processing device if the display driver chip does not include the configuration information related to the input information matching the input trigger instruction.

In some embodiments, the data processing device may further include a second transmission unit and a second controller.

The second transmission unit may be configured to transmit the input information to the display driver chip of the display device and to the processing device connected to the display device. The processing device may be configured to generate the second image based on the input information.

The second controller may be configured to control the processing device to output the second image to the display device in response to the first image output by the display device satisfying the target condition to replace the first image with the second image.

Further, the second controller may include a third control sub-unit or a fourth control sub-unit.

The third control sub-unit may be configured to control the processing device to output the second image to the display device in response to the processing device generating the second image.

The fourth control sub-unit may be configured to control the processing device to output the second image to the display device in response to the received trigger instruction satisfying the instruction condition.

In some embodiments, the second image may include the image obtained by fusing the first sub-image and the second sub-image. The processing device may be configured to generate the first sub-image based on the input information and the second sub-image based on the target APP information.

Further, the data processing device may further include a third controller.

The third controller may be configured to control the processing device to obtain the image adjustment instruction matching the first image in response to the display device outputting the first image to cause the processing device to perform the adjustment on the first image based on the image adjustment instruction.

The fourth controller may be configured to control the processing device to output the adjusted target image.

In some embodiments, the data processing device may also include an information transmission circuit.

The information transmission circuit may be configured to transmit the adjustment configuration information obtained based on parsing of the image adjustment instruction by the processing device to the display driver chip if the display driver chip includes the configuration information matching the image adjustment instruction. Thus, the display driver chip may be configured to perform the adjustment on the first image based on the adjustment configuration information to obtain the target image.

For specific implementations of each unit of embodiments of the present disclosure, reference may be made to the corresponding content above, which is not repeated here.

Figure 4:
FIG. 4 illustrates a schematic structural diagram of a data processing system according to embodiments of the present disclosure.

FIG. 4 illustrates a schematic structural diagram of a data processing system according to embodiments of the present disclosure. The system includes an input device 401 and a display device 402.

The input device 401 may be configured to obtain the input information.

The display device 402 may be connected to the input device. The display device 402 may include a display driver chip. The display driver chip may be configured to generate the first image based on the input information.

The display device 402 may be further configured to output the first image.

Correspondingly, the data processing system may further include a processing device.

The processing device may be configured to generate the second image based on the input information.

For specific implementations of the input device, the display device, and the processing device of embodiments of the present disclosure, reference may be made to the corresponding content above, which is not repeated here.

Embodiments of the present disclosure are described in a progressive manner. Each embodiment focuses on differences from other embodiments. Same and similar parts between embodiments may be referred to each other. For the device disclosed in embodiments of the present disclosure, since the device corresponds to the method of embodiments of the present disclosure, the description may be relatively simple. For the relevant part, reference may be made to the description of the method.

Those skills in the art may further realize that the units and algorithm steps of examples described in connection with embodiments of the present disclosure may be implemented by electronic hardware, computer software, or a combination thereof. In order to clearly illustrate the interchangeability of the hardware and the software, the composition and steps of the examples may be generally described according to the functions above. Whether these functions are executed by hardware or software may depend on a specific application of the technical solution and design constraint condition. Those skilled in the art may implement the described functions by using different methods for each specific application. This implementation should not be considered beyond the scope of the present disclosure.

The steps of the method or algorithm of embodiments of the present disclosure may be directly implemented in hardware, a software module executed by a processor, or a combination thereof. The software module may be arranged in random access memory (RAM), internal memory, read-only memory (ROM), electrically programmable ROM, electrically erasable programmable ROM, registers, hard disk, a removable disk, CD-ROM, or a storage medium in any other form in the technical field.

The above description of the disclosed embodiments enables those skilled in the art to implement or use the present disclosure. Various modifications to these embodiments may be apparent to those skilled in the art. The generic principles defined herein may be implemented in other embodiments without departing from the spirit or scope of the present disclosure. Therefore, the present disclosure is not limited to embodiments of the present disclosure but conforms to the widest scope consistent with the principles and novel features of the present disclosure.

What is claimed is:

1. A data processing method, comprising:
   obtaining input information inputted by an input device for display on a display device, the input information including at least one of an input graphic, input text, or a symbol generated through the input device;
   transmitting the input information to a display driver chip of the display device;
   controlling the display driver chip to process the input information to generate a first image output on the display device based on a processing algorithm stored in the display driver chip, the processing algorithm being configured to covert the input information into image data;
   in response to an input trigger instruction, controlling the display driver chip of the display device to obtain configuration information related to the input information matching the input trigger instruction, the input trigger instruction including an instruction generated by an operation of pulling the input device out of a fixture;
   processing the input information based on the configuration information and the processing algorithm to obtain the first image;
   transmitting the input information to a processing device connected to the display device, the processing device being configured to generate a second image based on the input information; and
   in response to a received trigger instruction being an optimization instruction for the first image output by the display device, controlling the processing device to output the second image to the display device to replace the first image with the second image, the optimization instruction for the first image including at least one of adding text information to the first image, or performing adjustment on the first image.

2. The method according to claim 1, wherein controlling the display driver chip of the display device to obtain the configuration information related to the input information matching the input trigger instruction includes:
   controlling the display driver chip of the display device to obtain the configuration information related to the input information matching the input trigger instruction from configuration information stored in the display driver chip; and
   in response to no configuration information related to the input information matching the input trigger instruction existing in the display driver chip, controlling the display driver chip to obtain the configuration information related to the input information matching the input trigger instruction from the processing device connected to the display device.

3. The method according to claim 1, wherein,
   the second image includes an image obtained by performing fusion on a first sub-image and a second sub-image, the processing device generating the first sub-image based on the input information and the second sub-image based on a target application information.

4. The method according to claim 1, further comprising:
   in response to the display device outputting the first image, controlling the processing device to obtain an image adjustment instruction matching the first image to cause the processing device to perform an adjustment on the first image based on the image adjustment instruction; and
   controlling the processing device to output an adjusted target image.

5. The method according to claim 4, further comprising:
in response to the display driver chip including the configuration information matching the image adjustment instruction, transmitting adjustment configuration information obtained by the processing device based on parsing the image adjustment instruction to the display driver chip to cause the display driver chip to perform the adjustment on the first image based on the adjustment configuration information to obtain the target image.

6. A data processing device comprising:
an acquisition circuit configured to obtain input information input by an input device for display on a display device, the input information including at least one of an input graphic, input text, or a symbol generated through the input device;
a first transmission circuit configured to transmit the input information to a display driver chip of the display device;
a first controller configured to:
control the display driver chip to process the input information to generate a first image output on the display device based on based on a processing algorithm stored in the display driver chip, the processing algorithm being configured to covert the input information into image data;
in response to an input trigger instruction, control the display driver chip of the display device to obtain configuration information related to the input information matching the input trigger instruction, the input trigger instruction including an instruction generated by an operation of pulling the input device out of a fixture; and
process the input information based on the configuration information and the processing algorithm to obtain the first image;
a second transmission circuit configured to transmit the input information to a processing device connected to the display device, the processing device being configured to generate a second image based on the input information; and
a second controller configured to, in response to a received trigger instruction being an optimization instruction for the first image output by the display device, control the processing device to output the second image to the display device to replace the first image with the second image, the optimization instruction for the first image including at least one of adding text information to the first image, or performing adjustment on the first image.

7. The device according to claim 6, wherein the first controller includes:
a first control sub-circuit configured to control the display driver chip of the display device to obtain the configuration information related to the input information matching the input trigger instruction from configuration information stored in the display driver chip; and
a second control sub-circuit configured to, in response to no configuration information related to the input information matching the input trigger instruction existing in the display driver chip, control the display driver chip to obtain the configuration information related to the input information matching the input trigger instruction from the processing device connected to the display device.

8. A data processing system comprising:
an input device configured to obtain input information, the input information including at least one of an input graphic, input text, or a symbol generated through the input device;
a display device, connected to the input device and including a display driver chip; and
a controller configured to:
control the display driver chip to process the input information to generate the first image output on the display device based on a processing algorithm stored in the display driver chip, the processing algorithm being configured to covert the input information into image data;
in response to an input trigger instruction, control the display driver chip of the display device to obtain configuration information related to the input information matching the input trigger instruction, the input trigger instruction including an instruction generated by an operation of pulling the input device out of a fixture;
process the input information based on the configuration information and the processing algorithm to obtain the first image;
transmit the input information to a processing device connected to the display device, the processing device being configured to generate a second image based on the input information; and
in response to a received trigger instruction being an optimization instruction for the first image output by the display device, control the processing device to output the second image to the display device to replace the first image with the second image, the optimization instruction for the first image including at least one of adding text information to the first image, or performing adjustment on the first image.

9. The system according to claim 8, wherein the controller is further configured to:
control the display driver chip of the display device to obtain the configuration information related to the input information matching the input trigger instruction from configuration information stored in the display driver chip; and
in response to no configuration information related to the input information matching the input trigger instruction existing in the display driver chip, control the display driver chip to obtain the configuration information related to the input information matching the input trigger instruction from the processing device connected to the display device.

10. The method according to claim 1, further comprising:
wherein a time when the processing device generates the second image is later than a time when the display driver chip generates the first image.

11. The method according to claim 1, wherein the processing algorithm includes an anti-aliased line drawing algorithm.

12. The method according to claim 1, wherein the input device includes a stylus.

* * * * *